United States Patent [19]

Hill

[11] 4,296,172

[45] Oct. 20, 1981

[54] INK TRANSFER MEMBER

[76] Inventor: Edward D. Hill, 11212 Edgewater Dr., Cleveland, Ohio 44102

[21] Appl. No.: 967,130

[22] Filed: Dec. 7, 1978

[51] Int. Cl.[3] .................. B32B 5/16

[52] U.S. Cl. .................. 428/331; 101/375; 101/401; 428/36; 428/404; 428/409; 428/423.1

[58] Field of Search .................. 29/132; 428/331, 425, 428/454, 909, 409, 447, 35, 36, 220, 404, 446; 101/368, 375, 401

[56] References Cited

U.S. PATENT DOCUMENTS

| | | | |
|---|---|---|---|
| 2,538,751 | 1/1919 | Hill | 117/46 |
| 2,598,167 | 5/1952 | Hill | 29/130 |
| 3,225,419 | 12/1965 | Milton et al. | 29/132 |
| 3,387,074 | 6/1968 | Hill | 264/259 |
| 3,475,803 | 11/1969 | Hill | 29/132 |
| 3,673,025 | 6/1972 | Fukuyama et al. | 156/154 |
| 3,686,731 | 8/1972 | Koori et al. | 29/132 |
| 3,724,047 | 4/1973 | Peterson | 29/132 |
| 3,757,398 | 9/1973 | Urban | 29/132 |
| 3,779,051 | 12/1973 | Kuesters | 29/132 |
| 4,046,946 | 9/1977 | Shaw | 428/454 |
| 4,174,244 | 11/1979 | Thomas et al. | 428/909 |

*Primary Examiner*—Bruce H. Hess
*Attorney, Agent, or Firm*—Wilson, Fraser, Barker & Clemens

[57] ABSTRACT

A transfer member for transferring ink, paint, and other like vehicles containing organic solvents and a process for its preparation are disclosed, characterized in that the member comprises a polymerized, cross-linked polyurethane, particulate silica, and a bonding amount of a reacted silane. Preferably, the cross-linked polyurethane is prepared by interreacting an organopolyisocyanate with a mixture of hydroxyl-containing organic compounds, such as an organodiol, an organotriol, and optionally, an organopolyol containing more than three hydroxyl groups.

11 Claims, No Drawings

INK TRANSFER MEMBER

BACKGROUND OF THE INVENTION

Transfer members usually in the form of rollers are commonly used in many industries for applying or transferring a coat or covering to a substrate. For example, rollers are used to apply organic liquid solutions or dispersions of all kinds such as paint, ink, adhesives, hot melts, etc., to various surfaces for decorative or protective purposes. Still other types of application may be effected by rollers, such as the application of an imitation or simulation wood graining to metal surfaces.

Ink transfer members of this type, especially printer's rollers, graining rollers, etc., require a peculiar combination of properties and are subject to severe use. One problem that has long plagued the use of transfer members is their susceptibility to the solvating action of organic solvents, such as benzene, toluol, acetone, and the like, which constantly contact and spread over the member. Under these circumstances, the hardness of the member increases during use because solvents leach away those components which keep the transfer member at a relatively durometer. The organic solvents may also attack a roller causing it to swell out of true and still otherwise destroy its useful physical properties. Wash-up fluids can be the worst offenders. Presses equipped with automatic wash-up features have to operate quickly and so use strong solvents.

One roller used in the printing industry is prepared from a composition of animal glue or such glue modified with glycerine. Rollers of this type, however, have certain disadvantages in that they are vulnerable to atmospheric conditions and to the action of ingredients contained in commercially used inks such as the described solvents. Rollers of this type are also quite hygroscopic and tend to absorb moisture and swell when the humidity is high. Further, in warm weather, the glue compositions become warm and flexible while, conversely, in cold weather they tend to become hard. The glue-glycerine rollers are relatively inexpensive but often have to be re-cast or re-surfaced because of their tendency to change in hardness, crack, and at times disintegrate during use.

Various substitutes have been proposed, such as rubber and vulcanized oil compositions. However, these materials are also quite susceptible to the action of oils and solvents in inks and the like. Rubber rollers especially are apt to swell. Moreover when these rollers dry, they are not only harder but shrink in size.

In order to impart some dimensional stability to ink transfer rollers, blankets, and the like, it has been proposed to use stronger and harder resins from which to form such transfer members, for example, synthetic resins having a Shore A hardness of about 75 to 90. However, such resins are not tacky and have a smooth, shiny surface, such that the ink transfer or ink carrying qualities are seriously adversely affected. On the other hand, if softer, more resilient resins are used, the transfer member is subject to undesired stretching and distortion which can force it out of true. Synthetic rubber inking transfer members which have tended to replace glue glycerine transfer members in modern high-speed presses are more stable but are inadequate for other reasons. For example, some polyurethanes have a tendency to depolymerize in use. Copolymers of butadiene and acrylonitrile harden and crack on exposure to oxygen.

Another type of inking roller in use has a surface formed of a polyester-based polyurethane. Such rollers are useful with hydrocarbon-based inks but have the disadvantage of being readily penetrable by vegetable oil inks which are commonly used in lithographic processes. Due to such penetration, a film of ink forms on the roller surface which creates a residual color-carryover problem, since any future printing is done on a film of ink rather than on the roller surface.

Rollers of the type last described have also been found to be quite susceptible to the action of certain solvents, such as the toluol solvents, that are used in graining inks and also swell due to contact with such solvents. Further, such polyurethanes have a tendency to revert to the liquid state unless an inhibiting agent is incorporated. Use of such an agent increases the cost and complicates the manufacture of the ink-transfer member.

In more recent years a hard rubber has been used in forming inking rollers and the like. While such hard rubber inking rollers have certain advantages, they still leave much to be desired. In particular, hard rubber transfer members have a limited life due to mechanical damage, swelling due to adsorption of an ink vehicle or organic solvent, and the development on the surface of a glaze which causes stripping. It is often necessary to clean such rollers every week or even more frequently.

My prior U.S. Pat. No. 2,538,751 discloses an inking roller of the glue-based type having a surface layer formed from a polyalkylene polysulfide synthetic resin containing an extender.

My prior U.S. Pat. No. 2,598,167 discloses a roller having a surface of animal glue and a central body of vesicular, similar animal glue and a softening material.

My prior U.S. Pat. No. 3,387,074 discloses a process for preparing an ink transfer member such as a printer's blanket from a liquid polyurethane reaction mix by the use of a sheet backing member which is subsequently removed to form the member.

My prior U.S. Pat. No. 3,475,803 discloses a roller for applying ink and the like comprising a layer of resilient cellular material and an outer surface of polyurethane overlying and surrounding the cellular material. The polyurethane is formed from the reaction of a polyethylene glycol, a polyol cross-linking agent, and an isocyanate.

U.S. Pat. No. 3,724,047 to Peterson discloses a polyurethane inking sleeve for a printing roller body which is made by mixing millable, curable polyurethane, a curing agent, plasticizer and fillers and then forming a sheet from the mixture. The sheet is overwrapped about a suitable mandrel and then cured after which the resultant structure is shaped by grinding to provide a tube of uniform wall thickness.

SUMMARY OF THE INVENTION

The principal object of the present invention is to provide a transfer member for ink, paint and the like which has improved tensile strength and resistance to organic solvents. A related object is to provide a transfer member which retains substantially the same durometer rating throughout its useful life. A further object is to provide a transfer member comprising a polyurethane elastomer prepared by reacting an organopolyisocyanate with a mixture of hydroxyl-containing compounds.

In one form, the ink transfer member includes an elastomeric body comprising a polymerized cross-linked polyurethane, particulate silica such as sand, and a reacted silane. Before reaction the silane has at least one reactive group and preferably two.

Particularly useful transfer members are obtained when the cross-linked polyurethane is prepared by interracting an organopolyisocyanate with organodiols and organotriols, provided that at least sufficient polyisocyanate is present to react stoichiometrically with all the active hydrogen atoms of the organodiol and organotriol.

In the preferred practice of the invention, another organopolyol is included, namely, one containing more than three hydroxyl groups. The various described organopolyols both react chemically with the isocyanate radical of the organopolyisocyanate to form the urethane linkage and as a cross-linking agent to produce the polymerized, cross-linked polyurethane. The silica particles contribute to the strength and solvent resistance of the ink transfer member, while the reactive silane acts as a bonding agent between the polyurethane elastomer and the silica particles.

The ink transfer member may be prepared by admixing the indicated components to form a reaction mix, preferably delaying the incorporation of the organopolyisocyanate until last. When the organopolyisocyanate is added, there may be some foaming due to a minute amount of moisture remaining. The reaction mix may be kept under reduced pressure until foaming has ceased to prevent voids in the casting. This may require up to 20 minutes or more, depending on how thoroughly the reaction mix has been dehydrated prior to addition of the organopolyisocyanate. The reaction mix is then molded to a desired shape of the transfer member, after which it is heated to convert it to a solid form.

By a choice of reactants, their respective amounts, and optional incorporation of plasticizers, a transfer member having a desired balance of strength, toughness, and a Shore A durometer of from about 15 to about 100 can be fabricated, depending upon the intended use of the transfer member. A preferred plasticizer is dipropylene glycol dibenzoate, because it surprisingly has great resistance to being leached out by the organic solvents normally found in inks, paints, and the like.

DESCRIPTION OF THE PREFERRED EMBODIMENTS

In one form, the present transfer member has an ink-contacting surface comprising a polymerized, cross-linked polyurethane having dispersed therein from about 50 to about 250 parts of particulate silica, based on 100 parts of the polyurethane, and a binding amount of a reacted silane. In general, the transfer member takes the form of a roller, although it may take still other forms such as a printer's blanket. The roller may entirely comprise the polyurethane and described components, or the roller may have a cylindrical center body of any suitable material which carries an ink-contacting outer sleeve or jacket of the polyurethane and described components. As used here and in the claims, the terms "transfer member" and "ink transfer member" are taken to include, for example, a transfer roller for carrying or distributing ink as from an inking roller to raised type or to a dry offset plate or to a lithographic planographic plate, or printer's blanket, an offset blanket as for a wrap-around or web-fed press, and the like.

Referring more particularly to the components of the transfer member, a polyurethane is generally prepared by reacting an organic compound having reactive hydrogen atoms, such as for example a polyester, a polyalkylene-ether glycol, a polyesteramide, a polyalkylene-thioether glycol, and the like with an organic polyisocyanate. Any suitable formulation may be used to produce the polyurethane elastomer. For example, suitable formulations and starting materials for polyurethanes are disclosed in U.S. Pat. Nos. 2,620,516; 2,621,165; 2,719,618; 2,764,565; and 2,778,810, such patents being hereby incorporated by reference. Various compounds which may serve to form a polyurethane are disclosed in the cited patents. Suitable activators, such as those also disclosed in the mentioned patents, may be used in forming the polyurethane.

One method of preparing a cross-linked polyurethane comprises reacting the organic compound having active hydrogen atoms such as the polyester, with an excess of the organic polyisocyanate needed to react with such organic compound and form an isocyanate terminated linear polymer. A cross-linker, sometimes also referred to as a chain-extender, is then reacted with the terminal isocyanate groups of such linear polymers to link linearaly two or more of such polymers together to produce a still longer linear polymer.

The chain extended linear polymer contains within the polymeric chains reactive sites, usually hydrogen atoms, which furnish reaction areas for the cross-linking reaction. The cross-linker also reacts with such reaction areas of two different linear polymers truly to cross-link them and thereby impart thermosetting properties to the ultimate elastomer form. In the present invention, the various hereinafter described organopolyols perform the dual functions of chain-extending and cross-linking in realizing the polymerized, cross-linked polyurethane. When here or in the claims, it is stated that at least sufficient organopolyisocyanate or organodiisocyanate is present to react stoichiometrically with all of the active hydrogen atoms of the various organopolyols, it is meant that preferably all of the organopolyols enter into the reaction forming the cross-linked polyurethane. If there is any excess left, preferably the excess is of the organopolyisocyanate.

Numerous organopolyisocyanates suitable for forming the polyurethane elastomers are well known in the art. Organodiisocyanates are preferred. Examples of the organopolyisocyanates include toluylene diisocyanate, 3, 3'-bitolylene-4, 4'-diisocyanate, diphenylmethane-4, 4'-diisocyanate, 3, 3'-dimethyldiphenylmethane-4, 4'-diisocyanate, meta-phenylene diisocyanate, 2, 4 toluylene diisocyanate dimer, triphenylmethane triisocyanate, hexamethylene diisocyanate, dianisidine diisocyanate, polyaryl triisocyanate, and the like.

Organodiols useful in preparing the cross-linked polyurethane include ethylene glycol, propylene glycol, butylene glycol, trimethylene glycol, diethylene glycol, triethylene glycol, dipropylene glycol, pentaethylene glycol, hexylene glycol, polyethylene glycol, cyclobutanediol, tetraethylene glycol, and the like.

Organotriols useful in the invention include hexanetriol, trimethylolpropane, trimethylolethane, glycerin, and the like.

In the preferred practice, organopolyols having more than three hydroxyl groups are included among the organodiols and organotriols. Such organopolyols include sorbitol, a product sold under the trademark "Quadrol" which is N.N.N.'N.'-tetrakis (2-hydroxylpropyl) ethylene diamine, pentaerythritol, adonite, dulcitol, xylitol, and the like.

The quantities of the respective reactants may be varied to a considerable extent, depending upon the particular use of the transfer member durometer sought, etc. I base the range of reactants used on an arbitrarily fixed amount of the organodiol employed. For example, a general range of relative proportions in parts by weight is about 100 parts of the organodiol, about 15 to about 50 parts of the organopolyisocyanate, and about 8 to about 25 parts of an organotriol, provided, as in all instances, that at least a sufficient amount of the organopolyisocyanate is present to react stochiometrically with all of the active hydrogen atoms of the organodiol and organotriol. This can be insured by using a stochiometric excess of the organopolyisocyanate. A slight excess, such as up to about five percent by weight, has not been seen to introduce harmful effects. Greater excesses tend to weaken the tensile strength of the transfer member.

When an organopolyol having more than three hydroxyl groups is included, a desired range of proportions of the reactants is, in parts by weight, about one hundred parts of the organodiol, from about 15 to about 55 parts of the organopolyisocyanate, about 6 to about 25 parts of the organotriol, and about 2 to about 12 parts of the organopolyol containing more than three hydroxyl groups. A preferred range of reactants is about 100 parts of the organodiol, about 18 to about 25 parts of the organopolyisocyanate, about 10 to about 15 parts of the organotriol, and about 2 to about 6 parts of the organopolyol having more than three hydroxyl groups. In both of these instances where the organopolyol is included, the amount of organopolyisocyanate present is at least sufficient to react stochiometrically with all of the active hydrogen atoms of the organodiol, organotriol, and defined organopolyol.

The particulate silica is present in an amount of about 50 to about 250 parts by weight based on 100 parts of the polyurethane elastomer. The silica preferably has an average particle size of about 25 microns to about 150 microns.

Silanes useful in the present invention have at least one reactive group and preferably two. More particularly, the reactive groups of the silane may be halogen, amino, mercapto, organo such as unsaturated alkyl up to about 8 carbon atoms, unsaturated cycloalkyl radicals up to about 8 carbon atoms, and aromatic radicals up to about 12 carbon atoms. Hydrolyzable groups may be present such as alkoxy groups up to about 6 carbon atoms. Although other silanes may be used, silanes useful in the invention correspond to the formula:

$$R_mR'_nSiX_p$$

in which R may be halogen, amino, mercapto, vinyl, allyl, propenyl, isopropenyl, acrylic, methacrylic, ethylacrylic, butenyl, isobutenyl, vinylene benzene, propylene benzene, butylene benzene, and vinylene toluene; R' is hydrogen, methyl, ethyl, propyl, isopropyl, butyl, isobutyl, phenyl, benzyl, toluyl, and xylyl; X, is methoxy, ethoxy, propoxy, butoxy, and acryloxy in which the acyl group is a hydrogen chain of a carboxylic acid having up to six carbon atoms; m is 1, 2, or 3; n is 0, 1, or 2; and p is 1, 2, or 3; the total of m, n, and p always being 4.

While all silanes of this formula are operable, silanes with certain reactive R groups are better suited for elastomers. For example, amino substituted silanes of the formula bond well with polyurethane elastomers. A preferred silane is aminotrimethoxy silane. The amount of silane used is not critical. Only enough need be used to effect a bonding action between the silica particles and the polyurethane that is formed. Ordinarily, about 0.05 to about 0.20 part by weight of the silane is used per 100 parts of the organodiol.

The transfer member may be cast or molded from a reaction mix comprising the indicated components. In general, the organodiol, organotriol, and optionally the organopolyol of more than three hydroxyl groups are mixed in any suitable mixing vessel and dehydrated to remove any water which may be present to avoid foaming when subsequently admixed with the organopolyisocyanate. The silica particles and silane are next added. If the mix at this point is heated to assure homogeneity, it should be carried out under reduced pressure. Except for the silica particles which are present as a dispersion, the indicated components are normally liquid at room temperatures. Some of the hydroxyl containing compounds are wax-like solids at room temperature, becoming liquids at about 120° F. If needed, an organic solvent which is later driven off may be included to insure solubility. A solvent such as cyclohexane may be used for this purpose.

The organopolyisocyanate is added to the reaction mix just prior to molding it to a desired shape. If desired, a catalyst may be used to accelerate reaction of the components to produce the cross-linked polyurethane, although the use of a catalyst is not essential. Normally, amino catalysts are used such as triethylamine, triethylenediamine, dimethyl ethanolamine, N-methyl morpholine, N,N'-diethylcyclohexylamine, N.N' dimethylpiperazine. Other catalysts that have been used to catalyze polyurethane reactions include bismuth nitrate, lead benzoate, lead oleate, sodium propionate, and lithium acetate.

If the reaction mix is cast as an entire roller, a suitable shaft is cleaned so as to be free from grease and then positioned within a roller mold. Alternatively, the shaft may be coated with an adhesive for polyurethane, such as polymerizable acrylic resin. The reaction mix is then cast into the tubular volume between the shaft and mold to form the roller, after which the assembly is heated to convert the mix to a solid form and adhere it to the shaft. The roller is then removed from the mold. For example, heating temperatures may range from about 160° F. to about 275° F. for one to four hours. U.S. Pat. No. 2,536,233 to Spencer illustrates a type of roller mold that may be used.

If desired, the reaction mix may be similarly cast as a tubular sleeve or jacket in a mold having a matching configuration. The resulting sleeve may be fitted about a previously formed roller body so as to form the ink-contacting surface of that roller. U.S. Pat. No. 3,724,047 to Peterson describes a technique that may be used to apply a sleeve about a roller body.

During the reaction which forms the transfer member, the silane is thought to react through its reactive groups with reactive groups on the polyurethane chains while having at least a physical if not chemical bond as well as the silica particles. This provides a strong union between the polyurethane and silica particles and contributes to the improved tensile strength of the transfer member.

The transfer member can be fabricated to have a desired durometer by the choice of reactants, then relative proportions, and if desired, by the addition of a plasticizer. For example, the transfer members may have Shore A durometers as follows, depending upon the intended end use of the roller.

| USE | SHORE A DUROMETER |
|---|---|
| Letterpress | 15 to 30 |
| Offset (Lithography) | 30 to 45 |
| Mechanical, as in feed rollers | 45 to 75 |
| Bridle Rollers used in Handling Steel Web | 75 to 100 |

A significant property of the present transfer member is that its durometer of whatever value remains substantially the same throughout its useful life, since the transfer member is appreciably less susceptible to the leaching effort of solvents. Moreover, since the transfer member successfully resists the action of solvents, its useful life is itself substantially increased. This, in turn, avoids downtime and the labor required to replace rollers which can be quite large and heavy.

Various plasticizers may be used in a plasticizing amount, for example, from about 5 to about 75 parts by weight per 100 parts of the organodiol. Such plasticizers may include tricresyl phosphate, dibutyl phthalate, dioctyl adipate, dioctyl phthalate, dioctyl sebacate, and the like. However, a preferred plasticizer is dipropylene glycol dibenzoate which has been found to impart substantial resistance to organic solvents normally found in inks, paints, and the like.

It will be understood that the compositions of the transfer member may be modified by the incorporation of other conventional additives which act as extenders or which change various properties, such as cure rate, color, cost, and the like. Such additives may include fillers, pigments, flame retardants, stabilizing agents, and the like.

The use of polyurethane rollers has been found to reduce substantially the noise level of paper handling rollers in large press rooms, for example, from as much as 45 decibels to as little as 20 decibels.

EXAMPLE 1

A reaction mix was prepared comprising 100 parts by weight of butylene glycol, 8 parts of trimethylolpropane, 75 parts of silica particles having an average particle size of about 50 to about 100 microns, and 0.10 part of aminotrimethoxy silane.

The reaction mix was stirred in a Lightning mixer to reduce viscosity and heated simultaneously in a vacuum kettle at about 240° F. and under a vacuum of 29 inches of mercury. This removed all water and achieved homogeneity. About 20 parts of toluylene diisocyanate were then added and the mix was immediately cast in a standard roller mold having a central rod or shaft around which the mix was poured. It is recommended to cool the reaction mix to about 150° F. to 160° F. before adding the diisocyanate in order to have enough pot life to pour properly. The mold was heated at about 240° F. to about 250° F. to convert the mix to a solid form. As a rule, depending upon the size of the roller, this may require from about 1 to about 6 hours.

EXAMPLE 2

A procedure was carried out like the procedure of Example 1 except that an organopolyol of more than three hydroxyl groups was included in the reaction mix. The complete mix comprised in parts by weight: 100 parts of butylene glycol, 6 parts of trimethylolpropane, 75 parts of silica particles, 0.10 parts of aminotrimethyloxy silane, 4 parts of Quadrol (N.N.N.'N.'-tetrakis) 2-hydroxyl-propyl) ethylene diamine, and 25 parts of toluylene diisocyanate.

Although the foregoing describes several embodiments of the present invention, it is understood that the invention may be practiced in still other forms within the scope of the following claims.

I claim:

1. A transfer member for ink, paint, and the like having an improved solvent-resistant, ink-contacting surface and substantially the same durometer rating throughout its useful life, said member comprising:

(a) a polymerized, cross-linked polyurethane, (b) a sufficient amount of particulate silica dispersed in said polyurethane to assist in providing such solvent-resistance, said amount ranging from about 50 to about 250 parts of particulate silica per 100 parts of said polyurethane, and (c) a binding amount of a silane also dispersed in said polyurethane and having at least one reactive group reacted with at least said polyurethane to bind said polyurethane and particulate silica together, (d) said silane prior to reaction corresponding to the formula:

$$R_mR'_nSiX_p$$

in which R may be halogen, amino, mercapto, vinyl, allyl, propenyl, isopropenyl, acrylic, methacrylic, ethylacrylic, butenyl, isobutenyl, vinylene benzene, propylene benzene, butylene benzene, and vinylene toluene; R' is hydrogen, methyl, ethyl, propyl, isopropyl, butyl, isobutyl, phenyl, benzyl, toluyl and xylyl; X is methoxy, ethoxy, propoxy, butoxy, and acryloxy in which the acyl group is a hydrocarbon chain of a carboxylic acid having up to six carbon atoms; m is 1, 2, or 3; n is 0, 1, or 2; and p is 1, 2, or 3; the total of m, n and p always being 4.

2. The ink transfer member of claim 1 in which said member is a roller.

3. The ink transfer member of claim 1 in which said polymerized cross-linked polyurethane is formed by interracting in parts by weight about 100 parts of an organodiol with about 15 to about 50 parts of an organopolyisocyanate and about 8 to about 25 parts of an organotriol, provided at least sufficient organopolyisocyanate is present to react stoichiometrically with all of the active hydrogen atoms of said organodiol and organotriol.

4. The ink transfer member of claim 3 in which said organodiol is selected from the group consisting of ethylene glycol, propylene glycol, butylene glycol, trimethylene glycol, diethylene glycol, triethylene glycol, dipropylene glycol, pentaethylene glycol, hexylene glycol, polyethylene glycol, cyclobutanediol, and tetraethylene glycol.

5. The ink transfer member of claim 3 in which said organotriol is selected from the group consisting of hexanetriol, trimethylolpropane, trimethylolethane, and glycerin.

6. The ink transfer member of claim 1 in which said polymerized cross-linked polyurethane is formed by interracting in parts by weight about 100 parts of an organodiol with about 15 to about 55 parts of an organopolyisocyanate, about 6 to about 25 parts of an organotriol, and about 2 to about 12 parts of an organopolyol containing more than three hydroxyl groups, provided at least sufficient organopolyisocyanate is present to react stoichiometrically with all of the active hydrogen atoms of said organodiol, organotriol, and organopolyol.

7. The ink transfer member of claim 6 in which said organopolyol containing more than three hydroxyl groups is selected from the group consisting or sorbitol, N.N.N.'N.'-tetrakis(2-hydroxyl-propyl)ethylenediamine, pentaerythritol, adonite, dulcitol, and xylitol.

8. The ink transfer member of claims 6 in which said parts by weight include about 100 parts of the organodiol, about 18 to about 25 parts of an organodiisocyanate, about 10 to about 15 parts of the organotriol, and about 2 to about 6 parts of the organopolyol.

9. The ink transfer member of claim 1 in which said particulate silica has an average particle size within the range of about 25 microns to about 150 microns.

10. The ink transfer member of claim 1 containing a plasticizing amount of dipropylene glycol dibenzoate.

11. An ink transfer roller having at least an ink-contacting surface thereof formed of a polyurethane elastomeric body having improved tensile strength and resistance to organic solvents, said body comprising from about 50 to about 250 parts of particulate silica based on 100 parts of said body to assist in providing such solvent resistance, and a binding amount of a silane having at least one reactive group reacted at least with said polyurethane to bond said polyurethane and particulate silica together, said polyurethane being formed by interreacting about 100 parts of an organodiol with about 15 to about 55 parts of an organodiisocyanate, about 6 to about 25 parts of an organotriol and about 2 to about 12 parts of an organopolyol containing more than three hydroxyl groups, and said silane prior to reaction corresponding to the formula:

$$R_mR'_nSiX_p$$

in which R may be halogen, amino, mercapto, vinyl, allyl, propenyl, isopropenyl, acrylic, methacrylic, ethylacrylic, butenyl, isobutenyl, vinylene, benzene, propylene benzene, butylene benzene, and vinylene toluene; R' is hydrogen, methyl, ethyl, propyl, isopropyl, butyl, isobutyl, phenyl, benzyl, toluyl, and xylyl; X is methoxy, ethoxy, propoxy, butoxy, and acryloxy in which the acyl group is a hydrocarbon chain of a carboxylic acid having up to six carbon atoms; m is 1, 2, or 3; n is 0, 1, or 2; and p is 1, 2, or 3; the total of m, n and p always being 4.

* * * * *